March 20, 1934.  G. A. LYON  1,951,800
METHOD OF AND APPARATUS FOR FORMING AND CUTTING TIRE COVER RIMS
Filed Nov. 5, 1931  7 Sheets-Sheet 6

Inventor.
George Albert Lyon.

March 20, 1934. G. A. LYON 1,951,800
METHOD OF AND APPARATUS FOR FORMING AND CUTTING TIRE COVER RIMS
Filed Nov. 5, 1931 7 Sheets-Sheet 7

Inventor
George Albert Lyon.
by Charles W. Neill Attys.

Patented Mar. 20, 1934

1,951,800

UNITED STATES PATENT OFFICE 1,951,800

METHOD OF AND APPARATUS FOR FORMING AND CUTTING TIRE COVER RIMS

George Albert Lyon, Allenhurst, N. J., assignor to Lyon Incorporated, Asbury Park, N. J., a corporation of Delaware Application November 5, 1931, Serial No. 573,197

19 Claims. (Cl. 29—33)

This invention has to do with tire covers of the character embodying a split resilient rim member for embracing the tread of a tire, and concerns itself more particularly with a method of and an apparatus for forming and cutting such rims.

One of the objects of this invention consists in the provision of a machine for producing material which may be cut up into tire cover rims having a transversely arcuate shape to fit over the tread of a tire.

A further object of the invention resides in the provision of a machine for producing a continuous strip in the form of a helix.

It is a further object of this invention to produce material which may be cut up into tire cover rims by a novel method.

Another object of the invention resides in the provision of an apparatus by which flat strip or ribbon stock is transformed into resilient, transversely arcuate material extending in the form of a spiral and having a longitudinal curvature which is normally less than that of the tire tread which it is to embrace, when cut up into tire cover rims.

It is still another object of this invention to provide an apparatus for forming a curved strip from flat stock, including means for varying the curvature of the material.

In carrying out the invention into practice, the machine involves a plurality of metal rolling elements arranged in tandem and driven from a suitable source of power, each set of elements performing its individual operation on the strip of stock until the desired transverse and longitudinal shape is imparted to the originally flat stock. Provision is made to cause the metal from the center of the stock to flow to thereby control the longitudinal curvature of the finished strip. Provision is further made for causing one longitudinal edge portion of the strip to be somewhat thinner than the other to thereby cause the finished strip to emerge from the last set of roll elements in the form of a helix. Suitable guide means are associated with the apparatus to insure the proper positioning of the finished strip and to conduct the latter to a cutting or shearing device by which the strip is cut into suitable lengths for use as tire covers.

Other and further important objects of this invention will be apparent from the following disclosures in the specification and the accompanying drawings.

Referring now more particularly to the drawings, wherein the same parts are designated throughout by the same reference characters, the machine or apparatus involving the present invention comprises a frame including a base 1 supported on legs 2 and carrying side uprights 3 and 4, in which bearings are provided for the shafts of cooperating metal rolling elements to be hereinafter described. A motor 5 or other suitable source of power imparts a rotary movement to the various elements through a system of gearing. It is to be understood, of course, that any form of mechanism may be employed for transmitting the driving power from the motor to the various elements. In accordance with the illustrated form of the invention, the motor 5 carries a pinion 6 meshing with a gear 7 on a main shaft 8, the latter carrying also a pinion 9 meshing with gears 10 and 11 on opposite sides thereof. Suitable brake instrumentalities generally indicated at 12 are preferably employed in connection with the gear 7 to bring the gearing system quickly to a stop when the motor 5 has been shut off. The main shaft 8 is supported by and revolves in suitable bearings carried by auxiliary side frame members 13 and 14.

Five sets of rolling elements are provided in accordance with the present invention, although it will understood that this number may be decreased or increased as desired without departing from the principles of this invention. The first or initial set of rolls comprises an upper male element 15 and a cooperating female element 16, the latter having the general shape of a spool whose flanges 17 straddle the male element 15 and serve as guides for a ribbon or strip 18 of flat stock such as sheet metal which is to be fed by the elements 15 and 16 in the direction indicated by the arrow 19. The elements 15 and 16 are spaced apart a distance substantially equal to the thickness of the ribbon or strip and are caused to rotate as indicated by the system of gearing or other driving mechanism heretofore mentioned, so that such elements serve to feed or progress the strip or ribbon 18 toward the forward end of the machine.

The second set of rolls comprises a male roll or element 20 and a cooperating female element 21, constituting in effect what are generally known as the "roughing rolls". The rolls 20 and 21 are like the rolls 15 and 16 of the initial set except that they are beveled at 22 and 23 respectively, the beveled surfaces of each roll cooperating with those of the other. As in the case of the first set of rolls, the roll 20, at its beveled edges 22 as well as at its outer periphery, is spaced from the corresponding portions of the companion roll 21, a distance corresponding to the thickness of the strip stock 18 to be rolled and fed thereby, the beveled edges serving to form oblique flanges 24 on the strip. It will thus be apparent that the overall or projected width of the strip as it emerges from the roughing rolls 21 and 22 is somewhat less than the initial width of the strip as it emerges from the initial set of rolls 15 and 16.

The strip now enters between the rolls 25 and 26 of the third set, which are cooperating male and female members, the roll 26 being, as in the case of lower or female roll 16 of the first set, in the form of a spool having flanges 27. As in the case of the preceding sets of rolls, the cylindrical surfaces of the rolls 25 and 26 are spaced apart substantially the thickness of the strip of sheet metal 18 to be worked. However, the flanges 27 of the female member 26 are spaced from the corresponding and cooperating ends of the roll 25 the same distance, the cooperating cylindrical surfaces of the rolls 25 and 26 being of lengths commensurate with the upper and lower unbent surfaces of the strip 18 passing between these rolls. The rolls 25 and 26, therefore, cause the oblique flanges 27 of the entering strip of sheet metal to assume positions as designated at 28 at substantially right angles to the body or unbent portion of the strip.

From the rolls 25, 26 the strip 18 issues in channel form, and proceeds between spinning wheels 29, by which the flanges 28 are spun inwardly into overlying relation to the body of the strip as indicated at 30. The wheels 29 may be positively driven or they may be idly mounted. In the latter event the wheels will be rotated by the strip itself as the latter is fed toward the front of the machine. The wheels 29 could, of course, be stationary, and still perform the desired operation.

Figure 6:
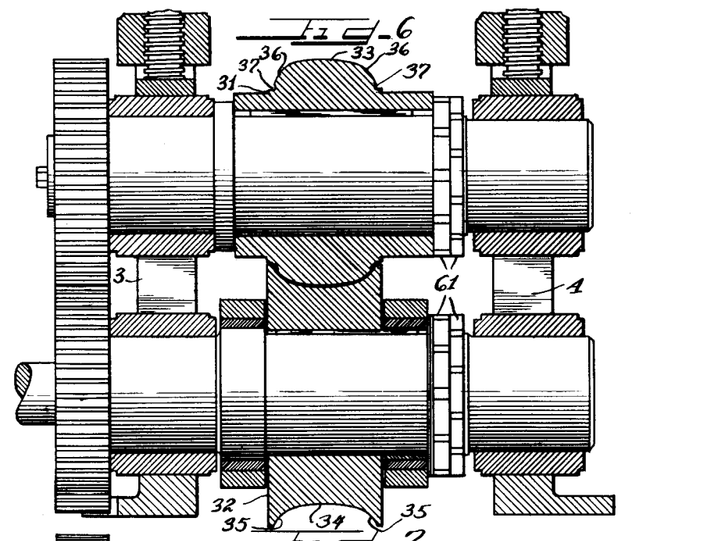
Figure 7:
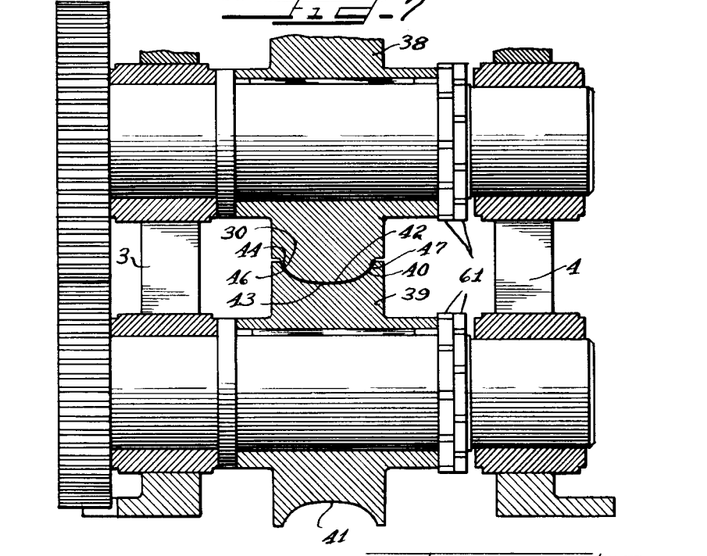
Figure 8:
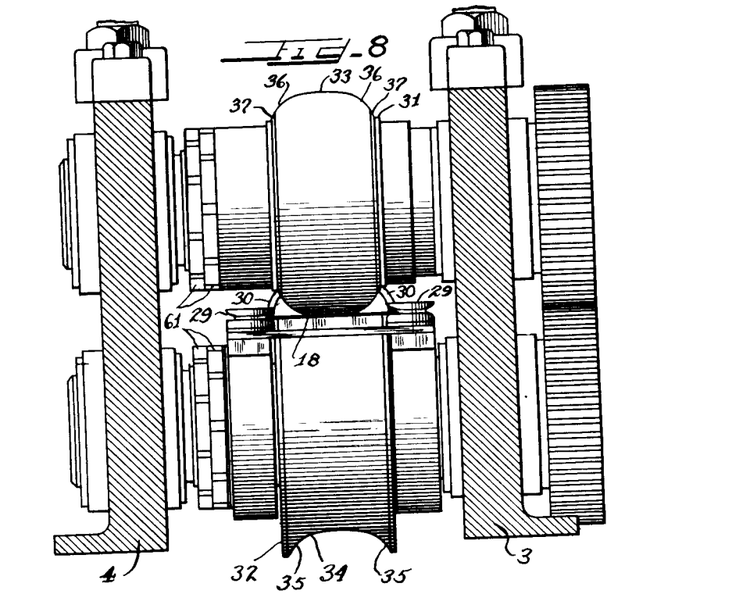
Figure 8 is a section taken approximately in the plane indicated by the line VIII—VIII of Figure 3.

After the spinning operation, the strip is fed between the male and female rolls 31 and 32, respectively, of the fourth set. These rolls have substantially arcuate cooperating surfaces 33 and 34 corresponding with the ultimate shape which it is intended to impart to the initially flat strip of stock. These surfaces are of substantially the same transverse length as the corresponding cylindrical surfaces of the rolls 25 and 26. The centers of the surfaces 33 and 34 are somewhat flattened with respect to the outer portions thereof, and are substantially alined with the preceding rolls when contacting the metal strip 18. The outer portions 35 of the female roll 32 spin or cam the marginal portions of the strip against the outer portions 36 of the male roll 31, and thereby impart a cross-sectionally arcuate shape to the strip as shown in Figures 6 and 8. The flanges 30 are forced into circumferential grooves 37 provided for their reception in the margins of the surface 33 of the male roll 31 without interfering with the proper engagement between the strip and said roll.

The fifth or finishing set of rolls comprising the male member 38 and the female member 39 are also formed with cooperating surfaces 40 and 41, respectively, of the same general shape as the surfaces 42 and 43 of the transversely arcuate strip entering between the same. Grooves 44 in the margin of the surface 40 have the same shape and function as the grooves 37, receiving the flanges 30 of the strip.

The surfaces 40 and 41 of the finishing set of rolls 38 and 39 differ from the preceding sets of rolls. The latter function merely to shape and feed the strip in a substantially straight line without causing any material flow of the metal as would occur in the rolling of metal. It is the ultimate desire, however, to form the strip not only in a cross-sectionally arcuate shape but in a helix or spiral of a substantially uniform curvature which has been predetermined so that when the finished strip 18ᵃ is cut into suitable lengths, each length may be used to embrace a tire thread and, if desired, to cooperate with a tire cover side plate to hold the latter in place on a tire. It is, therefore, necessary to perform a rolling operation upon the strip as it passes between the finishing rolls 38 and 39 whereby the central portion 45 of the strip will be thinned and thereby lengthened with respect to the margins, where the central portion is to constitute the outermost portion of the curved strip. It will be understood, of course, that only a slight difference in thickness of the portions mentioned is necessary in order to produce a substantial longitudinal curvature in the material. It will further be understood that by slight variations in the degree of thinning of the central portion of the strip, changes in curvature may be obtained. With this knowledge, changes and adjustments can easily be made to produce tire covers for different sizes of tires.

In imparting a longitudinal curvature to the strip, it will be appreciated that the strip would tend to turn back upon the machine and possibly interfere with the operation thereof. To meet this exigency, without harmful effects upon the finished product, I have so formed the finishing rolls 38 and 39 that when cooperating with each other in engagement with the strip, they are farther apart adjacent one margin 46 of the strip than at the other 47. The spacing is preferably such that the margin 46 of the strip retains substantially its initial thickness, the other margin 47 emerges somewhat thinner than the margin 46, and the central portion 45 is thinner than either margin. As a result of this, for a given length of strip as it is initially fed to the machine and to the last or finishing set of rolls, the margin 47 is somewhat longer than the margin 46, and the portion 45 is longer than either margin so that the emerging strip assumes a helical form in a direction away from the thinner margin 47 of the strip, and at substantially a right angle to the original direction of movement of the strip through the rolls. The pitch of the helix can of course be varied by varying the difference in thickness between the margins of the strip, and in any event should be made such that the strip 18ᵃ will be conducted away from the operating parts of the machine.

In order to properly conduit the finished strip 18ᵃ away from the operating parts of the machine, as well as to obviate any possibility of the strip accidentally engaging such parts, I provide a guard 49, which may also be of a generally helical form, to which is attached a supporting rail 50, and guide sheaves 51 or the like between the flanges of each of which the edges of the finished strip are received before passing over the rail 50.

The rolls 38 and 39, because of the force they are required to exert to cause the flow of metal in the strip above referred to, are of commensurate strength and design. As an aid to these rolls a shoe 52 is adjustably secured at 53 to the frame 1 of the machine and is provided with an arcuate surface 54 having a rounded rear edge or nose 55 for engagement with the convex surface 43 of the strip 18ᵃ emerging from the finishing rolls 38 and 39. The shoe 52 may be adjusted by the means 53 toward or away from the rolls 38 and 39 and its edge 55 is adapted to act as an auxiliary curving instrumentality to properly shape the finished strip. However, it is to be understood that the shoe 52 may be dispensed with, and complete reliance placed upon the rolls 38 and 39 for imparting the finishing or final shape to the metal strip.

It may be found desirable to omit the initial rolls 15 and 16 and possibly the rolls 31 and 32, in which event the finishing rolls 38 and 39 would be relied upon to impart the desired transverse and longitudinal curvatures and the helical shape to the finished strip. It is important, however, regardless which rolls are retained or discarded, that the desired configuration of strip be obtained.

The guide sheaves 51 are spaced apart in accordance with the distance between the edges of the finished strip 18ᵃ, and are somewhat offset from the corresponding sides of the rolls 38 and 39 sufficiently to properly receive the edges of the strip in view of the helical form of the latter as it emerges from the rolls 38 and 39. The sheaves 51 are carried by and may be adjusted lengthwise of a spindle 56, and toward or away from the rolls 38 and 39 by any suitable instrumentalities 57, the spindle 56 being preferably carried upon lever arms 58 pivoted at 59 to the frame uprights 3 and 4 of the machine. If desired, the arms 58 could be resiliently mounted to cause the sheaves 51 to yieldably engage the cooperating edges of the finished strip 18ᵃ.

Figure 1:
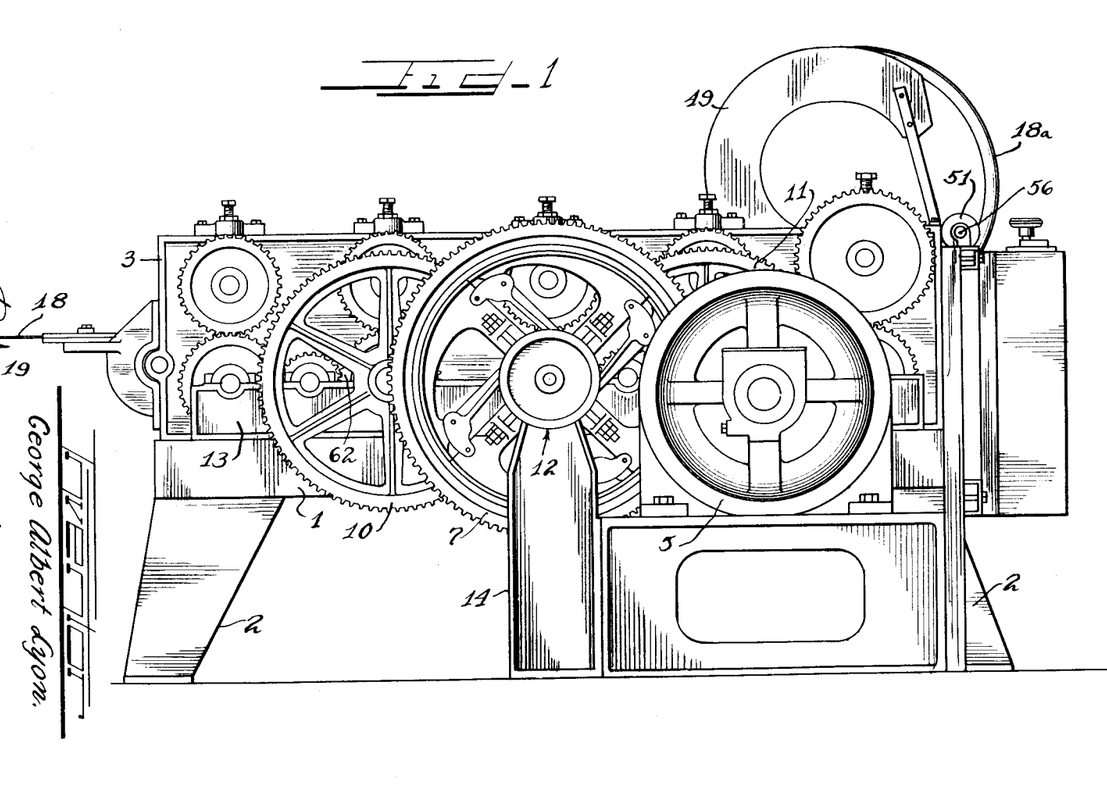
Figure 1 is a left side elevation of one form of machine embodying the present invention including a portion of the flat stock entering and the finished material leaving the machine.
Figure 2:
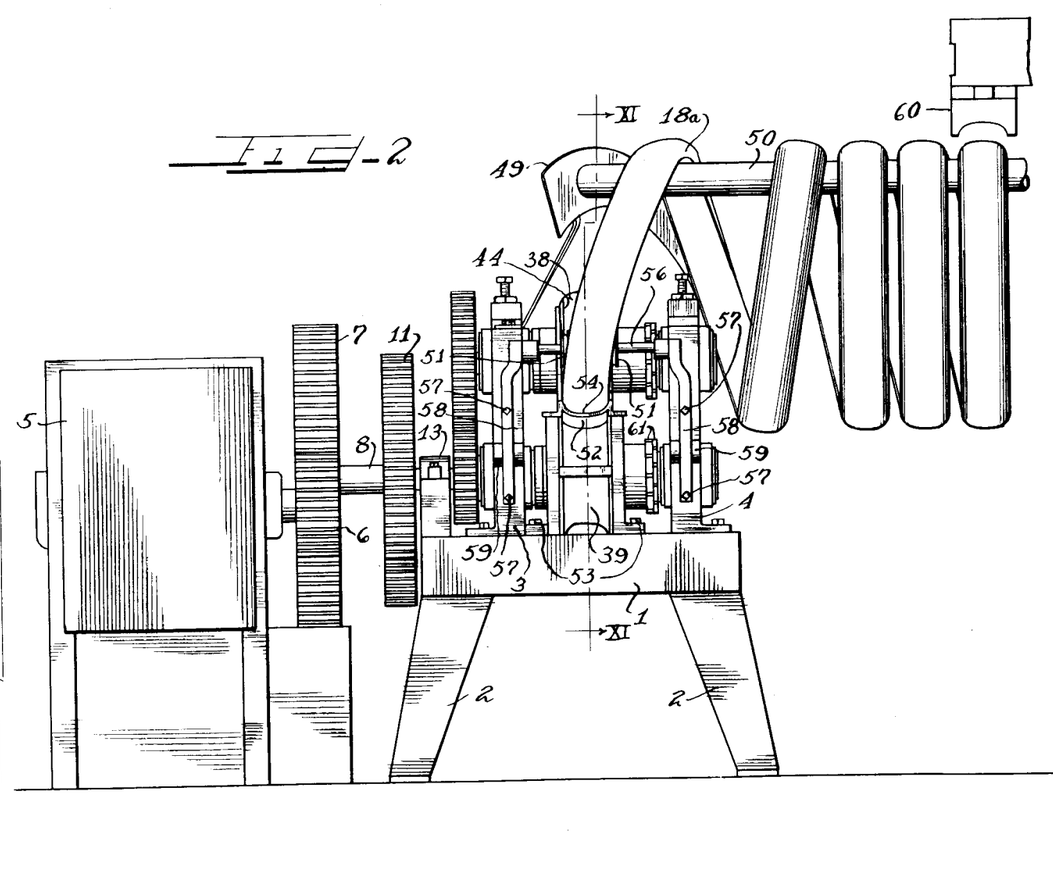
Figure 2 is a front elevational view of the same together with a device for shearing the finished material into predetermined lengths.
Figure 3:
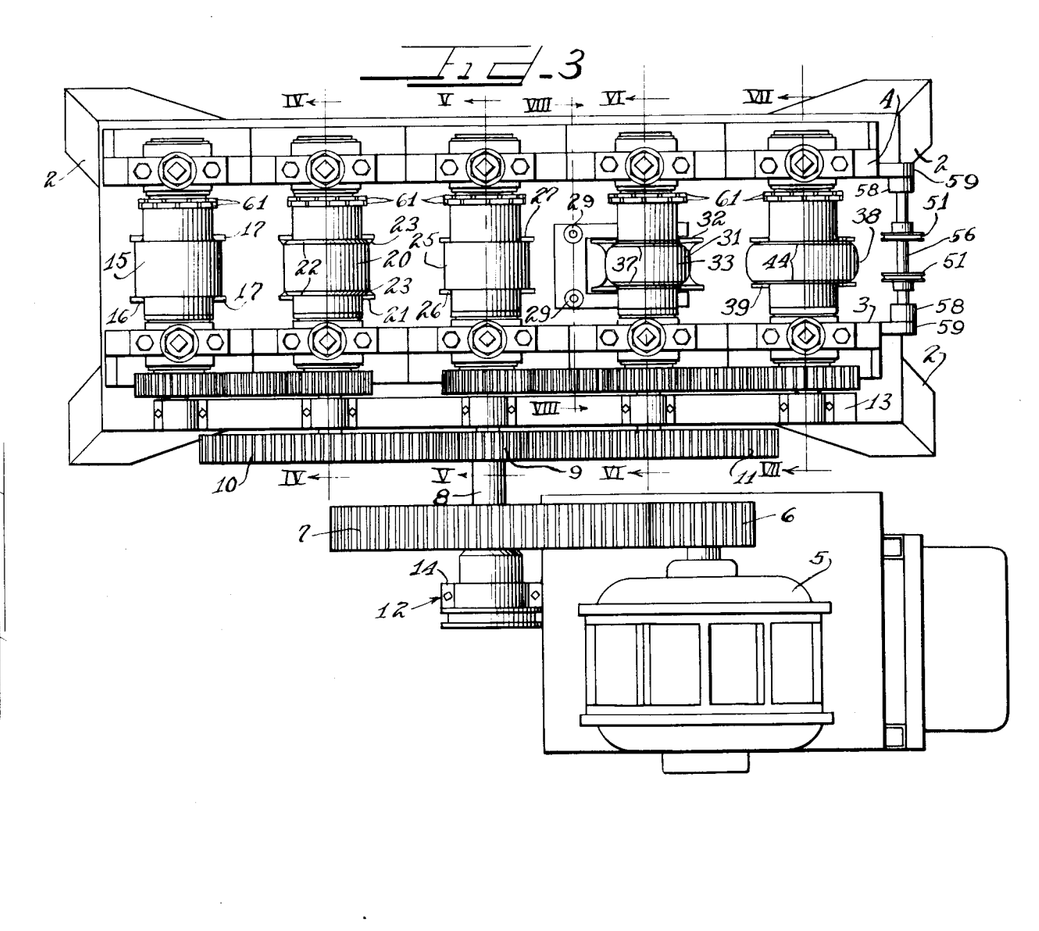
Figure 3 is a plan view of the same, the strip, guiding and shearing means being omitted.
Figure 4:
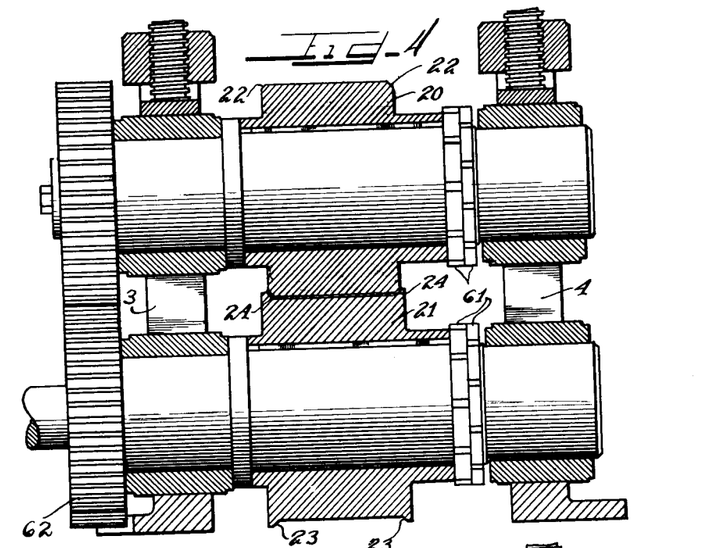
Figures 4, 5, 6 and 7 are similar cross-sectional views of four of the sets of rolling elements, taken as indicated by the lines IV—IV, V—V, VI—VI and VII—VII in Figure 3.
Figure 5:
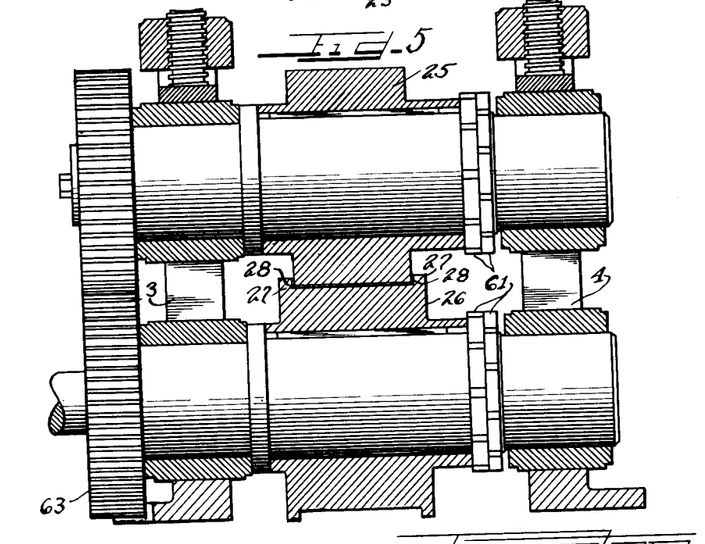

The supporting rail 50 may be of any desired length, but is preferably of such length as to permit the finished strip to coil about the same at least a few times before the strip reaches the shearing apparatus indicated generally at 60 and illustrated diagrammatically in Figure 2. Any suitable type of shearing apparatus may be employed and it is preferably so set up as to cut the finished strip into equal lengths, and is capable of adjustment to vary the length of material to be cut. By making the rail 50 of sufficient length to accommodate a plurality of coils of the finished strip, it will be appreciated that where a manually controlled shearing apparatus is employed, should for any reason the operation of the shearing apparatus be slowed up, the feeding of the strip from the machine need not be interrupted inasmuch as the excess strip material will simply gather in coils about the rail 50.

Each of the rolls employed in this machine is removably carried by a shaft whose ends are journalled in suitable bearings in the frame uprights 3 and 4, and is suitably adjusted by lock nuts 61 or the like.

The pitch of the helix of the finished strip is not such as to interfere with the positioning of the tire cover formed from each length of the strip upon the tread to be embraced thereby for the reason that the strip is of resilient material and has a normal diameter substantially less than the diameter of the tread of the tire to which it is to be applied. Thus, while if suspended free, the cover rim ends are displaced laterally from each other by substantially the pitch of the helix above referred to, yet the degree of resilience of the material is such that the force required to bring the ends in alignment is almost negligible. Consequently, the rim will tightly grip and embrace the tread of the tire to which it is applied without displaying any evidence whatever of its tendency when unstressed to assume a substantially helical shape.

The sheaves 51 may be employed as a further auxiliary means to impart the desired longitudinal curvature to the strip, or may be used instead of the shoe 52. Thus any inaccuracy in the curvature of the strip as it leaves the rolls 38 and 39, whether due to wear of the rolls, non-homogeneity of the strip material or any other condition, will be corrected by the shoe 52 or the sheaves 51 or both.

It will be appreciated that the apparatus is in no wise confined to use with a continuous strip or ribbon, but rather is equally susceptible of use in connection with pre-cut individual strips of suitable lengths. Where individual strips are employed, the shearing device 60 could be used for finishing the ends or could be dispensed with. The finished pieces would be formed in the same shape as the continuous strip and would be deposited upon the rail 50 with their ends lowermost, each piece crowding the preceding piece along the rail to the right as viewed in Figure 2. The rail 50 would then serve as a support from which an attendant could remove the pieces for whatever further operation may be found desirable, such as chrome plating.

Moreover, the spinning wheels 29 could be positioned between the fourth and fifth sets of rolls, if desired.

Figure 9:
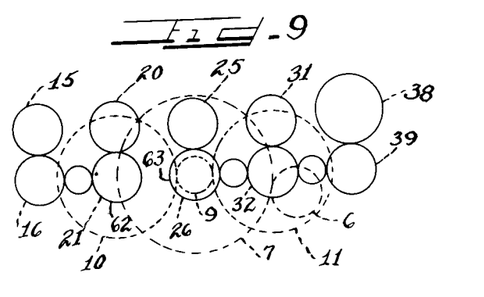
Figure 9 is a diagrammatic elevation showing the gear trains for driving the various rolls.
Figure 10:
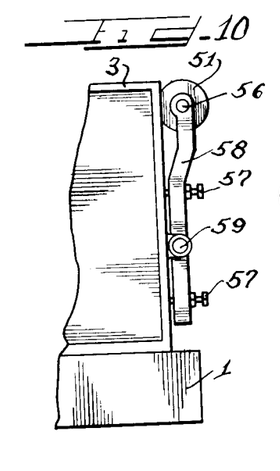
Figure 10 is a fragmentary elevational view of a detail of the invention.
Figure 11:
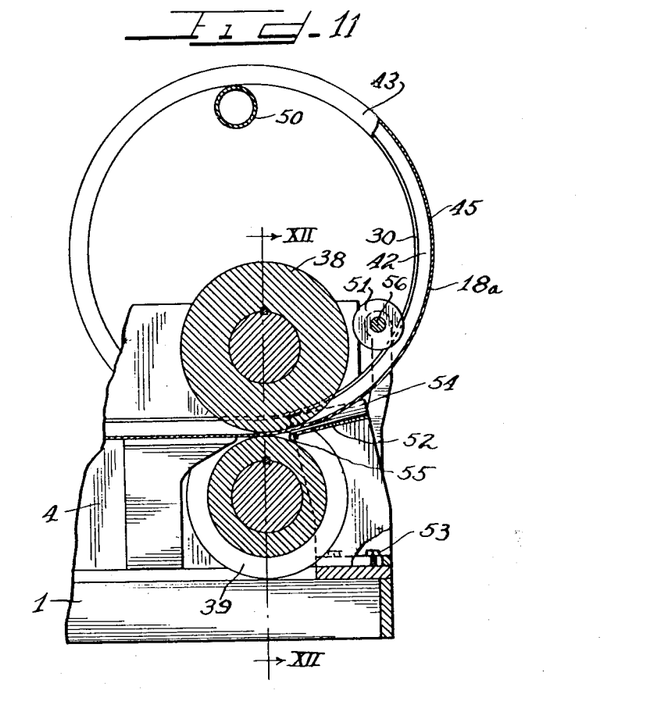
Figure 11 is a longitudinal sectional view of a portion of the machine and particularly the last set of rolling elements from which the material issues, taken approximately as indicated by the line XI—XI in Figure 2.
Figure 12:
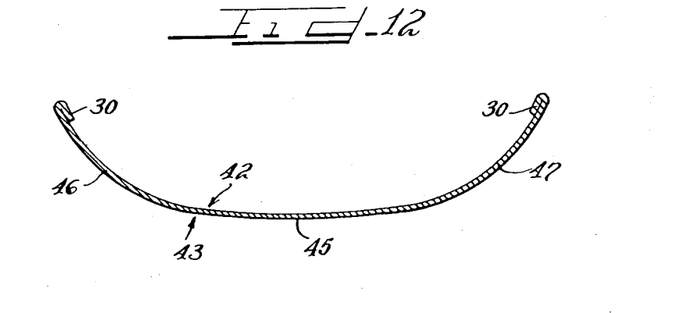
Figure 12 is an enlarged transverse sectional view taken approximately as indicated by the line XII—XII of Figure 11.

Upon reference to the drawings, particularly Figure 9, it will be clear that the rolls 15, 16, 20 and 21 are rotated by gearing from the gear 62 which turns with the gear 10, and that the rolls 25, 26, 31, 32, 38 and 39 are rotated by gearing from the gear 63 which turns with the gears 7 and 9.

From the foregoing, it will be observed that the strip or ribbon moves in a substantially straight line as far as the finishing rolls 38 and 39. Starting with a flat strip, the rolls 20 and 21 form oblique flanges, which are further bent to substantially right angular relation to the body of the strip. The spinning wheels 29 cause the flanges to lie flat against the upper surface of the strip, whereupon the latter assumes a transversely substantially arcuate shape as it emerges from the rolls 31 and 32. The final rolls 38 and 39 stretch out the central portion and, to a smaller degree, one margin of the strip so that the latter issues in a helical form.

It will further be understood that, in view of the resilience of the strip material, the finishing rolls 38 and 39 could be designed to impart only longitudinal curvature to the strip and the helical feature omitted, the laterally offset sheaves 51 being utilized to guide the strip helically to one side and onto the rail 50. The strip would then extend along the rail 50 with the aid of the guard 49 because it would be continuously fed by the machine. In the case of individual lengths of the material, each piece would be deposited upon the rail and be pushed along the same by the succeeding pieces, or each could be removed by the attendant upon its leaving the machine, with or without first contacting the sheaves 51.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In an apparatus for producing from a continuous ribbon of sheet metal of substantially uniform thickness, tire covers or the like in the form of transversely arcuate split rings, complemental male and female rolls having their cooperating surfaces transversely arcuate and so formed and arranged that they approach each other most nearly at their centers and to a greater extent adjacent one longitudinal edge than the other longitudinal edge, whereby the ribbon emerging from said rolls is transversely arcuate and forms a helix.

2. An apparatus for producing from a continuous ribbon of sheet metal of substantially uniform thickness, tire covers in the form of transversely arcuate split rings, said apparatus comprising means for imparting a transversely arcuate shape to said ribbon, and means for elongating the central portion of the ribbon relative to the edge portions thereof, whereby the ribbon issuing from the last named means has a longitudinally curved shape with the central portion of the ribbon outermost.

3. An apparatus for producing from a continuous ribbon of sheet metal of substantially uniform thickness, tire covers in the form of transversely arcuate split rings, said apparatus comprising instrumentalities for imparting a transversely arcuate shape to said ribbon, and means for changing the length of the central portion of the ribbon relative to the edge portions thereof whereby said ribbon, upon emerging from said means, will have a longitudinally curved shape.

4. An apparatus for producing from a continuous ribbon of sheet metal of substantially uniform thickness, tire covers or the like in the form of transversely arcuate rings, said apparatus comprising instrumentalities for imparting a transversely arcuate shape to said ribbon, means for changing the length of the central portion of the ribbon relative to the edge portions thereof whereby said ribbon, upon emerging from said means, will have a longitudinally curved shape, and a device for elongating one of the edges of the ribbon relative to the other, whereby the finished ribbon will assume the form of a helix.

5. An apparatus for producing from a continuous ribbon of sheet metal of substantially uniform thickness, tire covers in the form of transversely arcuate split rings, said apparatus comprising instrumentalities for imparting a transversely arcuate shape to said ribbon, means for changing the length of the central portion of the ribbon relative to the edge portions thereof whereby said ribbon, upon emerging from said means, will have a longitudinally curved shape, and a device for alongating one of the edges of the ribbon relative to the other, whereby the finished ribbon will assume the form of a helix whose axis extends at substantially right angles to the original direction of movement of the ribbon.

6. An apparatus for producing from a continuous ribbon of sheet metal of substantially uniform thickness, tire covers in the form of transversely arcuate split rings, said apparatus comprising instrumentalities for imparting a transversely arcuate shape to said ribbon, means for changing the length of the central portion of the ribbon relative to the edge portions thereof whereby said ribbon, upon emerging from said means, will have a longitudinally curved shape, a device for elongating one of the edges of the ribbon relative to the other, whereby the finished ribbon will issue in the form of a helix, and a guard for preventing engagement of the helical ribbon with the operative parts of the apparatus.

7. An apparatus for producing from a continuous ribbon of sheet metal of substantially uniform thickness, tire covers in the form of transversely arcuate split rings, said apparatus comprising instrumentalities for imparting a transversely arcuate shape to said ribbon, means for changing the length of the central portion of the ribbon relative to the edge portions thereof whereby said ribbon, upon emerging from said means, will have a longitudinally curved shape, and a guard for preventing engagement of the ribbon with the operative parts of the apparatus.

8. An apparatus for producing from a continuous ribbon of sheet metal of substantially uniform thickness, tire covers in the form of transversely arcuate split rings, said apparatus comprising instrumentalities for imparting a transversely arcuate shape to said ribbon, means for changing the length of the central portion of the ribbon relative to the edge portions thereof whereby said ribbon, upon emerging from said means, will have a longitudinally curved shape, a device for elongating one of the edges of the ribbon relative to the other, whereby the finished ribbon will be issued in the form of a helix whose axis extends at an angle to the original direction of movement of the ribbon, means for shearing the helical ribbon into desired lengths, and a support for guiding a plurality of coils of the ribbon to the shearing means.

9. An apparatus for producing from a continuous ribbon of sheet metal of substantially uniform thickness, tire covers in the form of transversely arcuate split rings, said apparatus comprising instrumentalities for imparting a transversely arcuate shape to said ribbon, means for changing the length of the central portion of the ribbon relative to the edge portions thereof whereby said ribbon, upon emerging from said means, will have a longitudinally curved shape, means for shearing the ribbon into desired lengths, and a support for guiding the ribbon to the shearing means.

10. An apparatus for producing from a continuous ribbon of sheet metal of substantially uniform thickness, tire covers in the form of transversely arcuate split rings, said apparatus comprising instrumentalities for imparting a transversely and longitudinally arcuate shape to said ribbon, and a device for elongating one of the edges of the ribbon relative to the other, whereby the finished ribbon will be issued in the form of a helix, means for shearing the helical ribbon into lengths, a support for guiding a plurality of coils of the ribbon to the shearing means, and means for guiding the helical ribbon to said support.

11. An apparatus for producing tire covers in the form of transversely arcuate split rings from a continuous ribbon, said apparatus comprising instrumentalities for imparting a transversely arcuate shape to said ribbon, means for elongating the central portion of the ribbon relative to the margins thereof whereby said ribbon will be longitudinally curved, a device for elongating one margin of the ribbon relative to the other, whereby the finished product will issue in the form of a helix, means for shearing the helical ribbon into lengths, and a support for guiding the coiled ribbon to the shearing means, said support normally carrying less coils than capacity so that a temporary slowing down or stopping of the shearing means will not interfere with the continued formation and feeding of the helical ribbon.

12. An apparatus for producing tire covers in the form of transversely arcuate split rings from strip metal or the like, said apparatus including a pair of complemental male and female rolls having coacting arcuate surfaces to impart a transversely arcuate shape to the metal, means for imparting a helical shape to the transversely arcuate metal, grooved guide means for receiving the longitudinal edges thereof to guide the metal issuing from said means, and means for supporting the helical metal in spaced relation to the apparatus.

13. In an apparatus for producing a tire cover in the form of a transversely arcuate split ring from a piece of ribbon material, complemental means for spinning the margins of the material to form smooth edges, male and female rolls having cooperating transversely arcuate metal rolling surfaces spaced apart in accordance with the thickness of the material, one of said rolls having spaced annular grooves of a depth and width substantially equal to the thickness and width of the spun margin of said material, whereby when the material is engaged by said rolls it will be given a transversely arcuate shape, the spun margins being received by said grooves in order not to interefere with the action of the rolls.

14. An apparatus for producing from a ribbon of sheet metal of substantially uniform thickness, a tire cover in the form of a transversely substantially arcuate split ring, said apparatus including means for doubling the edges of the ribbon upon the latter, means for imparting a transversely substantially arcuate shape, corresponding to the transverse contour of the tread of a tire, to the ribbon with the edges on the concave side whereby the convex surface will be uninterrupted and the outermost edges of said ribbon will be smooth, and instrumentalities for forming the ribbon into a helix.

15. An apparatus for bending a substantially straight piece of metal or the like to a definite longitudinal curvature, comprising complemental rolls for imparting to the piece an initial curvature of approximately the desired curvature, and means engageable under pressure with spaced portions of the convex and concave portions of the piece, said means and the juxtaposed surfaces of the rolls being arranged on an arc of the circle of the desired curvature, whereby the pressure of said means will automatically vary with the degree of approximation in curvature of the piece issuing from the rolls.

16. The method of forming a transversely arcuate ring from a flat strip which comprises the steps of forming flanges at the edges of the strip, spinning the flanges into overlying relation to one side of the strip, and stretching the strip centrally and longitudinally to cause the central portion to be longer than the edges, whereby the curvature at the edges will exceed that at the central portion.

17. The method of forming a tire cover part or the like which consists in rolling a strip from a flat form to one in which it has a curved cross section and exerting slightly more pressure on one edge of the strip than on its other so as to cause the strip to assume a spiral form.

18. The method of forming a split tire cover part or the like which consists in rolling a strip from a flat form to one in which it has a curved cross section and exerting slightly more pressure on one edge of the strip than on its other so as to cause the strip to assume a spiral form, and shearing the resultant spiral strip into split coils of predetermined length.

19. The method of forming a tire cover part or the like which consists in rolling a flat strip into a transversely curved form, and exerting greater pressure at the center of the strip than at its edges and greater pressure at one edge than at the other to cause the strip to assume a spiral form.

GEORGE ALBERT LYON.